United States Patent [19]

Deborde et al.

[11] Patent Number: 4,510,976

[45] Date of Patent: Apr. 16, 1985

[54] FLOW DISTRIBUTOR FOR FLUID CIRCUIT AND ITS APPLICATION TO SHUTTLELESS LOOMS WITH PNEUMATIC INSERTION OF THE WEFT

[75] Inventors: Albert H. Deborde; Gilles Grandvallet, both of Bourgoin Jallieu, France

[73] Assignee: Saurer Diederichs (Societe Anonyme), Bourgoin Jallieu, France

[21] Appl. No.: 541,669

[22] Filed: Oct. 13, 1983

[30] Foreign Application Priority Data

Oct. 26, 1982 [FR] France .................................. 82 18360

[51] Int. Cl.³ .............................................. D03D 47/30
[52] U.S. Cl. ................................... 139/435; 137/561 A
[58] Field of Search ................... 139/435; 137/561 A; 226/97

[56] References Cited

U.S. PATENT DOCUMENTS

| | | |
|---|---|---|
| 1,613,876 | 1/1927 | Douglass . |
| 4,256,140 | 3/1981 | Swaroop et al. ............... 137/561 A |
| 4,284,243 | 8/1981 | Shaner ............................ 137/561 A |
| 4,392,517 | 7/1983 | Takahashi ........................... 139/435 |

FOREIGN PATENT DOCUMENTS

| | | |
|---|---|---|
| 2245904 | 2/1974 | France . |
| 2475649 | 2/1980 | France . |
| 1403623 | 8/1975 | United Kingdom . |
| 1565050 | 4/1980 | United Kingdom . |
| 2065254 | 6/1981 | United Kingdom . |

Primary Examiner—Henry S. Jaudon
Attorney, Agent, or Firm—Karl F. Ross; Herbert Dubno

[57] ABSTRACT

A flow distributor for a fluid circuit is especially applicable for use in a shuttleless loom with pneumatic insertion of the weft and comprises a body of revolution, produced from two parts assembled coaxially and forming therebetween an annular inner chamber defined by a conical wall and by a frusto-conical wall. The annular chamber connects a tubular mouthpiece for the inlet of fluid disposed on the central axis body with a plurality of outlet holes provided concentrically and at regular angular intervals around the central axis and able to receive screw-threaded couplings. This flow distributor is especially used for supplying compressed air to groups of relay nozzles on a shuttleless loom.

12 Claims, 4 Drawing Figures

FLOW DISTRIBUTOR FOR FLUID CIRCUIT AND ITS APPLICATION TO SHUTTLELESS LOOMS WITH PNEUMATIC INSERTION OF THE WEFT

FIELD OF THE INVENTION

The present invention relates to a flow distributor for a fluid, (pneumatic or hydraulic) circuit. This invention relates more particularly, though not exclusively, to shuttleless looms with pneumatic insertion of the weft.

BACKGROUND OF THE INVENTION

In this type of loom, the pneumatic system for insertion of the weft most frequently comprises an insertion nozzle, situated on one side of the loom, and numerous relay nozzles located along the axis of insertion, over the entire width of the loom. These relay nozzles, creating jets of air which complete the action of the insertion nozzle in order to pull and guide the weft thread until it reaches the other side of the machine, are distributed in groups each of N nozzles, each group of nozzles being supplied with compressed air by the same pneumatic pipe, the opening or closing of which is controlled by a solenoid valve actuated according to a predetermined sequence. Downstream of this solenoid valve, it is thus advisable to divide the flow of compressed air, corresponding to the consumption of all the relay nozzles of the group, into N partial flows, each of which will supply one of the relay nozzles of this group.

For applications of this type, one presently uses flow distributors in the form of parallelepipedal units of relatively slight thickness, with a central or lateral compressed air inlet and with a certain number of substantially aligned outlet passages on one of the faces of the parallelepipedal unit. An arrangement of this type favors the central outlet passage or passages, at the expense of the terminal outlet passages, a "baffle" effect being produced in the path of the compressed air between the inlet and the terminal outlet passages. Thus, the partial flows in the various outlet passages are not all equal and differences are also ascertained between the outlet passages for the response time on use and possibly for the pressure.

OBJECT OF THE INVENTION

It is an object of the present invention to remedy these drawbacks by providing a flow distributor for a fluid circuit of new design, making it possible to obtain absolutely equal partial flows in all its outlet passages.

SUMMARY OF THE INVENTION

To this end, the flow distributor of the invention is constructed generally as a body of revolution with an annular inner chamber defined by two coaxial walls, one being conical and the other frustoconical, this annular chamber connecting a fluid inlet orifice, centered on the axis of the body and situated at one end of the latter, opposite the point of the conical wall, with a plurality of outlet passages distributed concentrically and at regular angular intervals all around the axis of the body, at its end remote from the central inlet orifice.

It will be understood that this flow distributor, appearing externally as a unit with symmetry of revolution, with a fluid inlet along its axis and with N outlet passages distributed over a circle centered on its axis, the fluid passing through an annular chamber with conical and frustoconical walls ensuring homogeneous diffusion towards the outlet passages, makes it possible to supply all these outlet passages under absolutely identical conditions as regards flow and pressure.

The fluid inlet orifice at one end of the body may be formed by a central tubular mouthpiece connected to the annular chamber. Preferably, a rounded transition area is provided for the connection of the cylindrical inner wall of this tubular mouthpiece to the frustoconical wall of the annular chamber, to promote an adhering effect of the fluid.

For an easy construction of the flow distributor according to the invention with its annular inner chamber and the desired surface qualities, the body of this distributor advantageously results from the joining of two parts, machined separately then assembled coaxially for example by being fitted together, the first part comprising the central tubular mouthpiece as well as the outer frustoconical wall of the annular chamber, whereas the second part comprises the inner conical wall of the annular chamber and the outlet passages distributed concentrically.

According to a particular embodiment, the central tubular mouthpiece is screwthreaded externally and the remainder of the first part of the body has, at least over part of its height, an external structure which can be hexagonal allowing the screwing of said mouthpiece by means of a suitable tool. Assembly of the distributor thus becomes very easy. As regards the outlet passages, which are distributed concentrically, the latter may be made in the form of tapped holes opening into the annular chamber and able to receive threaded couplings, to which are connected the beginnings of N pipes for the utilization of the fluid receiving equal flows.

In the particular case where the invention is applied to shuttleless looms with pneumatic insertion of the weft, in order to resolve the problem described in the introduction, the flow distributor supplies compressed air to all the relay nozzles of the same group of N relay nozzles, each relay nozzle of this group being connected by a pipe to one of the N outlet passages, distributed concentrically, of the distributor. All the relay nozzles of the group in question thus receive the same flow of compressed air and consequently produce jets with uniform characteristics.

BRIEF DESCRIPTION OF THE DRAWING

The invention will be better understood from the ensuing description referring to the accompanying diagrammatic drawing illustrating, as a nonlimiting example, one embodiment of this flow distributor, applied to the supply of relay nozzles in a shuttleless loom with pneumatic insertion of the weft. In the drawing.

SPECIFIC DESCRIPTION

Figure 1:
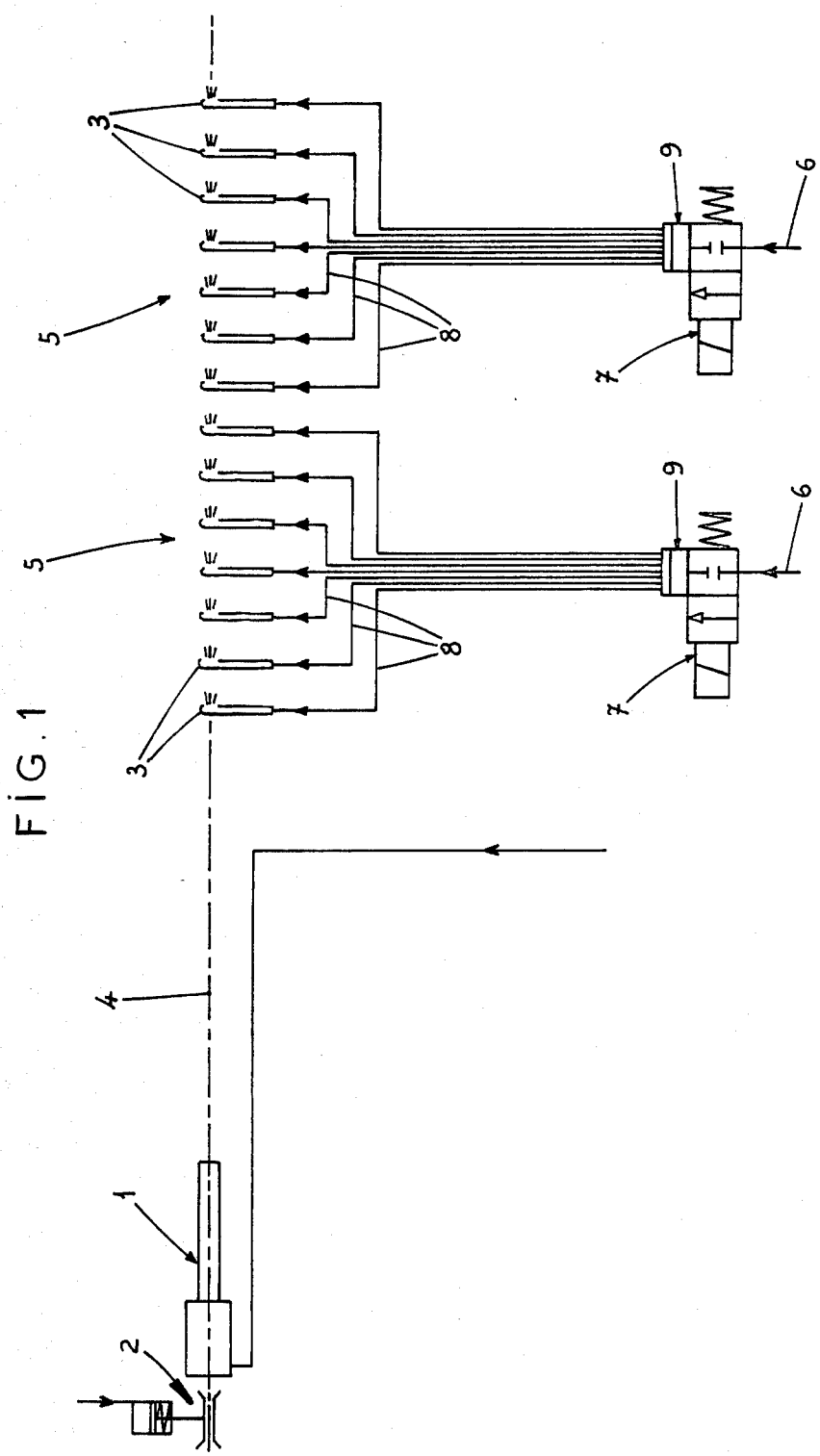
FIG. 1 is a very diagrammatic view of a pneumatic system for the insertion of the weft in a shuttleless loom, with groups of relay nozzles whereof the pneumatic supply circuits use the flow distributor according to the invention.

FIG. 1 shows very diagrammatically and partially the pneumatic system for the insertion of the weft provided on a shuttleless loom, this system comprising: an insertion nozzle 1, situated on one side of the loom and preceded by a pneumatic weft gripper 2 and numerous relay nozzles 3 arranged along the insertion axis 4, over the entire width of the loom. The relay nozzles 3 are distributed in successive groups 5, for example each of seven nozzles. Each group 5 is supplied with compressed air by a pneumatic pipe 6, leading to a solenoid valve 7. Immediately downstream of the solenoid valve 7, the pneumatic circuit which supplies a group 5 of relay nozzles 3 is subdivided into seven branches 8, each of which supplies compressed air to one of the nozzles 3 of the group in question. The flow distributor which is the object of the invention, designated generally by the reference numeral 9, is located downstream of the solenoid valve 7 in order to divide the total flow of compressed air, travelling through the pipe 6, into seven partial flows which are all equal and directed towards the seven relay nozzles 3 by the respective circuit branches 8.

Figure 2:
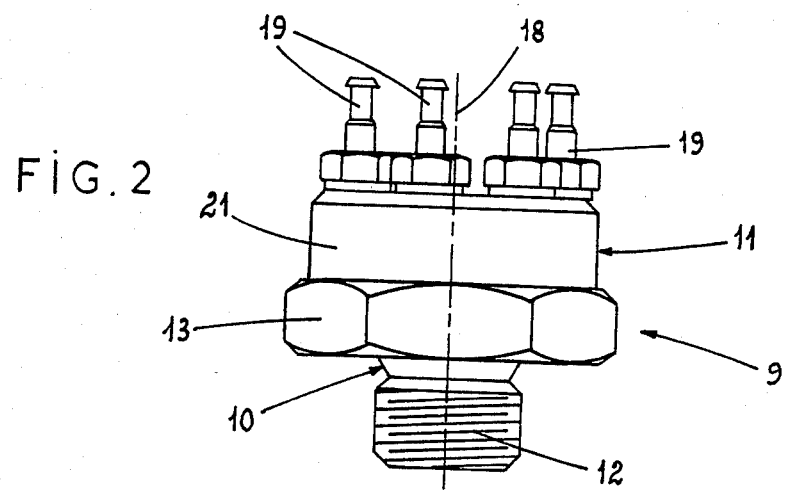
FIG. 2 is a side view of a flow distributor according to the invention, with seven outlet passages.
Figure 3:
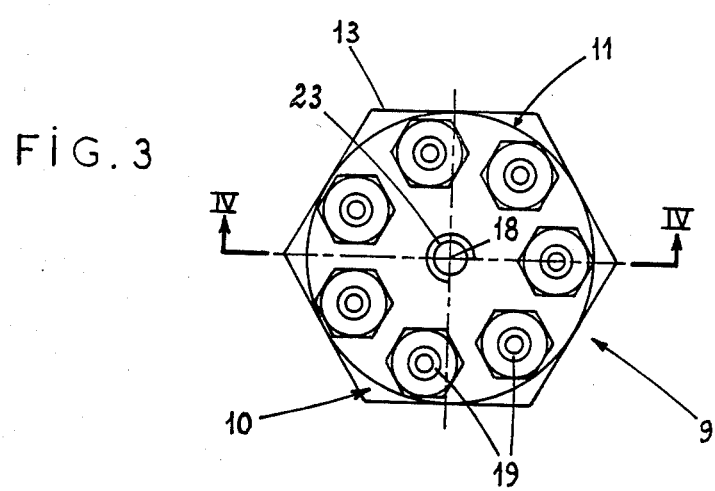
FIG. 3 is a plan view of the distributor of FIG. 2.
Figure 4:
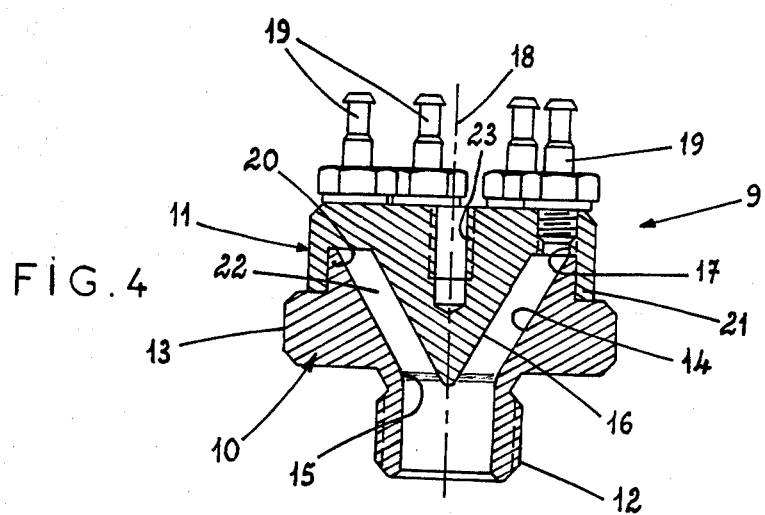
FIG. 4 is an axial sectional view taken along line 4—4 of FIG. 3.

The flow distributor 9, in its particular embodiment illustrated in FIGS. 2 to 4, is composed of two coaxial parts 10, 11, machined separately then joined by fitting one in the other.

The first part 10 comprises a tubular mouthpiece 12 screwthreaded externally, surmounted by a part 13 of larger diameter and having an external hexagonal shape. The inner wall of this part 13 is a frustoconical surface 14 connected by a rounded transition area 15 to the cylindrical inner wall of the mouthpiece 12—see FIG. 4.

The second part 11, of cylindrical outer shape, has a conical central point 16 situated opposite the mouthpiece 12 and it is provided on its periphery with seven tapped holes 17, distributed concentrically and at regular angular intervals all around the axis 18 of the said part 11. Each tapped hole 17 receives a screwed coupling 19.

The two parts 10, 11 also comprise complementary annular parts 20, 21 for their assembly by fitting one in the other. When these two parts are connected in this way, the frustoconical wall 14 of the first part 10 and the conical point 16 of the second part 11 define an annular chamber 22, which ensures the continuity of passage between the tubular mouthpiece 12 and each of the seven tapped holes 17.

In order to use a flow distributor 9 of this type, the latter is screwed by its mouthpiece 12 onto the compressed air supply member and this is by means of a spanner adapted to the hexagonal part 13. Each of the seven outlet pipes is connected to one of the couplings 19. In view of the uniform distribution of the outlet holes 17 all around the axis 18 and of the uniform supply of these holes through the annular chamber 22, the inlet flow is divided into seven partial flows which are all equal and the pressures at the various outlets are also all equal.

As shown in the drawing, the second part 11 may comprise a central tapped blind hole 23, for fitting retaining members of the outlet pipes, particularly if the latter are flexible pipes.

Naturally, the invention is not limited to the single embodiment of this flow distributor which was described above, by way of example, in the framework of a particular use. On the contrary, it includes all variations of construction and application based on the same principle. Thus, in particular, it would not be outside the scope of the invention:

to modify the peripheral parts such as the hexagonal part, which do not participate in the flow distribution;

to resort to solutions other than a screwthreaded mouthpiece, in order to form the inlet orifice and to allow the sealed attachment of the flow distributor;

to use other types of fixed or removable couplings, for example with rapid assembly, on the outlet passages;

to modify the number of these outlet passages;

to use the same distributor for pneumatic circuits in areas having no relationship to looms, or even on hydraulic circuits.

What is claimed is:

1. A flow distributor for a compressed air fluid circuit, comprising a body of revolution with an annular inner chamber defined by an inner circumferentially continuous conical wall and an outer circumferentially continuous frustoconical wall centered on a common axis, the annular chamber connecting a fluid inlet orifice disposed along said axis at one end of said body opposite the point of the conical wall, said body being provided with a plurality of axial outlet passages distributed in a circular array concentrically and at regular angular intervals around the central axis at an opposite end of said body remote from the central inlet orifice and communicating directly with said chamber.

2. A flow distributor according to claim 1, in which the body comprises, at one end, a central tubular mouthpiece forming the fluid inlet orifice and connected to the annular chamber.

3. A flow distributor according to claim 2, in which a rounded transition area is provided for the connection of the cylindrical inner wall of the tubular mouthpiece to the frusto-conical wall of the annular chamber.

4. A flow distributor according to claim 1, in which said outlet passages are tapped holes opening into the annular chamber and able to receive screwthreaded couplings.

5. A flow distributor according to claim 1, in which its end comprising the outlet passages also is provided with a tapped central blind hole for fitting members for retaining the outlet pipes.

6. The incorporation of the flow distributor according to claim 1 in a shuttleless loom having pneumatic insertion of the weft, with the flow distributor adapted to supply compressed air to relay nozzles of a group of relay nozzles and with each relay nozzle being connected to one of the outlet passages of the distributor.

7. A flow distributor for a compressed air fluid circuit, comprising a body of revolution with an annular inner chamber defined by an inner circumferentially continuous conical wall and an outer circumferentially continuous frustoconical wall centered on a common axis, the annular chamber connecting a fluid inlet orifice disposed along said axis at one end of said body opposite the point of the conical wall, said body being provided with a plurality of axial outlet passages distributed in a circular array concentrically and at regular angular intervals around the central axis at an opposite end of said body remote from the central inlet orifice and communicating directly with said chamber, said body comprising at said one end, a central tubular mouthpiece forming the fluid inlet orifice and connected to the annular chamber, the body being constituted by two parts assembled coaxially, the first part comprising the central tubular mouthpiece and the frustoconical outer wall of the annular chamber, and the second part comprising the inner conical wall of the annular chamber and the outlet passages.

8. A flow distributor according to claim 7, in which the two parts also comprise complementary annular parts for their assembly by fitting one in the other.

9. A flow distributor according to claim 8, in which its central tubular mouthpiece is screwthreaded externally, the remainder of the first part having, at least on part of its height, a polygonal construction allowing the screwing of said mouthpiece by means of a suitable tool.

10. The incorporation of the flow distributor according to claim 7 in a shuttleless loom having pneumatic insertion of the weft, with the flow distributor adapted to supply compressed air to relay nozzles of a group of relay nozzles and with each relay nozzle being connected to one of the outlet passages of the distributor.

11. A flow distributor according to claim 7 in which said outlet passages are tapped holes opening into the annular chamber and able to receive screw-threaded couplings.

12. A flow distributor according to claim 7, in which its end comprising the outlet passages also is provided with a tapped central blind hole for fitting members for retaining the outlet pipes.

* * * * *